Sept. 17, 1968             A. W. KALLS             3,401,587
MAGNET PIN
Filed Jan. 13, 1967
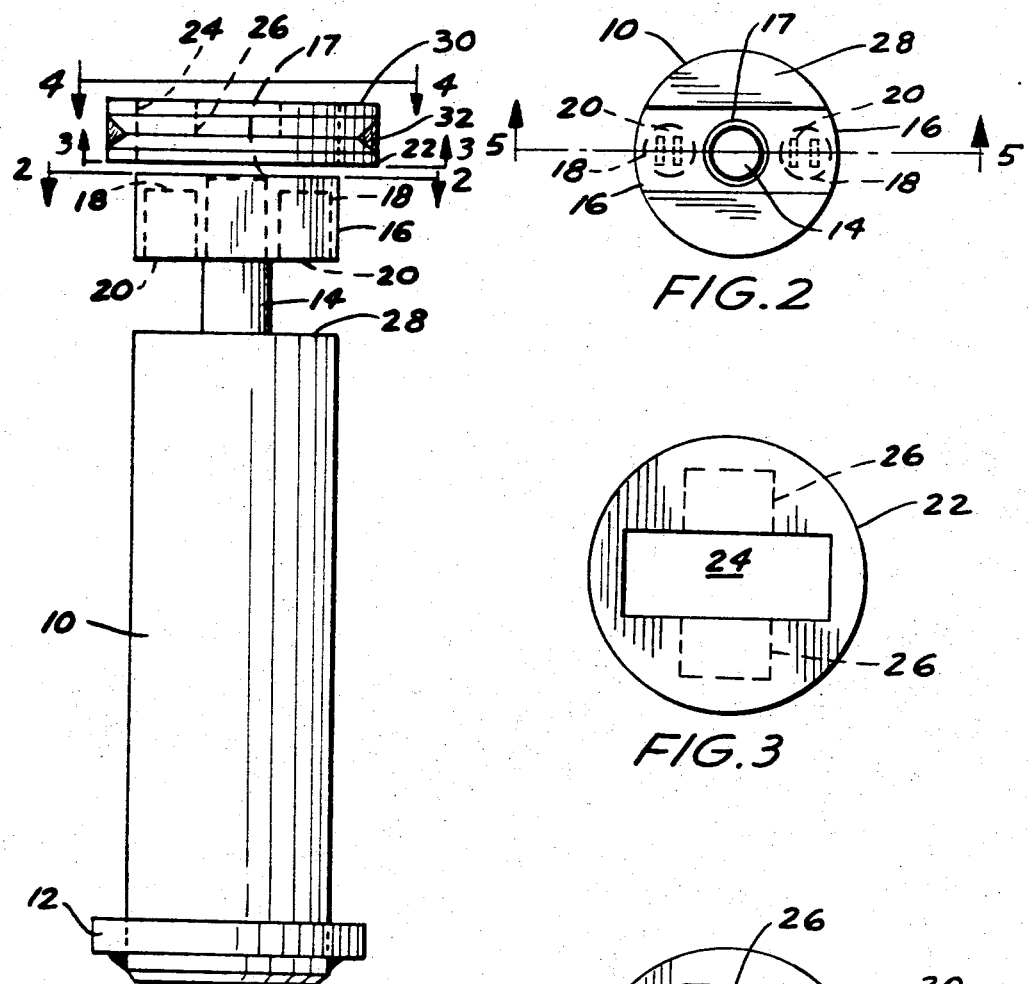
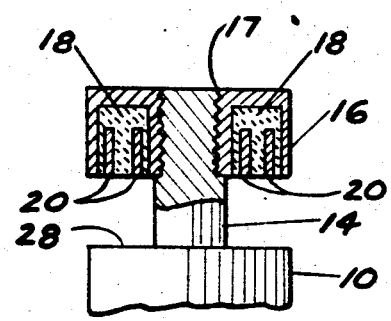
ANDREW W. KALLS
INVENTOR.
BY H. M. Saragovitz
E. J. Kelly, H. Berl
M. V. Wallace
ATTORNEYS

United States Patent Office 3,401,587
Patented Sept. 17, 1968

3,401,587
MAGNET PIN
Andrew W. Kalls, Warren, Mich., assignor to the United States of America as represented by the Secretary of the Army
Filed Jan. 13, 1967, Ser. No. 609,726
3 Claims. (Cl. 85—7)

ABSTRACT OF THE DISCLOSURE

An apparatus of the pin type for use in fastening parts together comprising, a pin having a head on one end and a nut on undercut portion with a T-section at its opposite end and having permanent magnet means within the undercut face thereof to lock nut to the T-section.

---

The invention described herein may be manufactured and used by or for the Government of the United States of America for governmental purposes without payment of any royalties thereon or therefor.

The invention relates to fasteners and more particularly a new and improved pin-type fastener for use in coupling parts together.

In the past many types of fasteners have been designed and built to accomplish this result, but it has been found that some have various deficiencies that prevent their accomplishing what is required of them, such as the use of cotter pins and snap rings requiring tools to apply and remove and which require time to apply. Also it has been found that the shear value of the old type of retainer is very low compared with the strength of the pin.

The present disclosure provides a new and improved pin-type fastener that more closely approaches the requirement of a bolt and nut type fastener than any known pin fastener.

The principal object of the present invention is to provide a new and improved fastener comprising a pin having a head on one end thereof and an undercut portion with a T-section at its other end, the T-section containing permanent magnet means within the undercut face thereof, adapted to removably engage a slotted nut having a through slot therein to engage and slip over said T-section and hold the same in locked relationship with said pin member.

Another object of the invention is to provide a new and improved two-piece fastener wherein the tensile strength of the pin is equal to the size of the undercut section thereof.

A further object of the invention is to provide a new and improved two-piece fastener having a quater turn slotted nut and the use of permanent magnets to hold the nut in locked relationship upon a pin member.

A still further object is to provide a new and improved two-piece fastener that can be freely rotated so that surface wear will be evenly distributed.

The above and other objects will appear more fully from the following more detailed description, and from the drawing, wherein:

FIGURE 1 is an exploded view of the pin and nut per se.

FIGURE 2 is a top plan view of the pin showing the contour of the T-section.

FIGURE 3 is a bottom plan view of the nut taken substantially along line 2—2 of FIGURE 1, showing the T-section of the nut.

FIGURE 4 is a top plan view of the nut taken substantially along line 4—4 of FIGURE 1 showing the T-section cut entirely through the nut and the cross-section partially through the nut; and FIGURE 5 is a section taken substantially along line line 5—5 of FIGURE 2, of the T-section thereof and showing how the permanent magnets are installed therein.

Referring now to the drawing the numeral 10 designates a pin or bolt member constructed of steel, or the like, the same being of substantially round configuration, and in this instance illustrates one of many possible configurations being approximately six inches high and two inches in diameter. The lower end of the pin 10 has formed integrally therewith a head portion and same extending outwardly from the pin portion to form a circumferential flange member 12.

The upper portion of the pin 10 is undercut to form a stem portion 14 adapted to receive and permanently support a rectangularly shaped bar member 16 having an opening 17 therethrough to receive one end of stem 14 and support bar 16, the assembly comprising a T-section having a diameter comparable to the pin 10. The underside of bar 16 is cored or recessed, as at 18, to receive permanent magnets 20, for a purpose later to be described.

The numeral 32 designates a metal nut member comprising a round steel cap member, preferably machined and formed in two parts, the bottom portion 22 of the nut, FIGS. 1 and 3, having cut therein a rectangular opening 24, whereas the corresponding top section 30, FIGS. 1 and 4, has a rectangular opening cut therein, but in addition a duplicate slot 26, the same being cut only partially through section 30 at a 90° angle to slot 24, as shown best in FIG. 4 of the drawing. When nut sections 22 and 30 are permanently joined together, the two cut-through sections 24 are in alignment to form a through slot for bar member 16 to pass through and slot 26 seats on bottom portion 22 and forms a partial slot member 26 formed at a 90° angle to through slot 24. Nut 32 is of greater diameter than pin 10.

The manner in which the device operates is as follows:

When it is desired to couple two parts together, such as when a tongue is coupled to a vehicle hitch, or the like, the tongue opening is brought into alignment with the hitch opening and pin 10, with nut 32 removed, is inserted or threaded therethrough, flange 12 acting as a bottom stop. Nut 32, with opening 24 therein, is then aligned with bar 16 and passed down over said bar, section 22 of nut 32 passing over bar 16 first, so that when the nut 32 drops down and seats upon surface 28 of pin 10, with top section 30 of nut 32, facing the bottom of bar 16, the nut is turned a quarter turn so that bar 16 is in alignment with duplicate partial slot 26. The nut is then lifted to contact permanent magnets 20 in bar 16 which in turn hold nut 32 in locked position against the bar. Inasmuch as nut 32 is of greater diameter than pin 10, and extends outwardly beyond the circumference of pin 10 to form a circumferential flange therefor, said flange provides an upper stop member to hold the pin within the confines of the tongue and hitch openings.

To disengage nut 32 from bar 16, the user has simply to pull downwardly on nut 32 so that the nut is removed from magnets 20 and drop down on surface 28 of pin 10 and is turned a quarter turn until opening 24 is aligned with bar 16 and the nut is lifted over the bar and off same.

There has been disclosed herein a coupling device that is simple to manufacture, yet is a tremendous improvement over the well-known pin fasteners comprising a head and snap ring, or where cotter pins are required as closures which require tools to apply and remove and which take up valuable time in assembly. Also the shear value of retainers such as cotter pins, snap rings etc., is very low compared with the strength of the pin. Also some pins do not rotate so that wear is not evenly distributed and some require preparation of additional parts at pin holes or specially drilled holes. All of these drawbacks have been overcome with the instant invention.

While the present design of the assembly allows clearance, or end play of the pin at least equal to the depth of the half way through slot in the nut, this can be overcome by using a rotating or sliding cam at the nut to reduce this end play.

It will be obvious to those skilled in the art to which the invention relates that modifications may be made in details of construction and arrangements and matters of mere form without departing from the spirit of the invention which is not limited to such matters or otherwise than the prior art and the appended claims may require.

I claim:

1. A fastener of the type described comprising, an elongated member having a radially extending flange member at one end thereof and an undercut portion to form a reduced stem on the other end thereof, a transverse bar member secured to said stem member having magnet means in the underside thereof, a nut member of greater diameter than said elongated member having an opening therethrough corresponding to the shape of and being of a size slightly greater than said bar member, said nut member adapted to be passed over said bar member to said reduced stem and then to be rotated one-quarter turn, whereby said nut member is held in interlocked relationship with said bar member by said magnet means.

2. A fastener as set forth in claim 1 wherein the opening in said nut member is a rectangular opening, and said nut member has a duplicate slot cut only partially therethrough at a 90° angle to said through opening to provide means for interlocking said elongated member with said magnet containing bar member.

3. A fastener of the type described comprising, an elongated member having a flange member at one end thereof, the same being of greater diameter than said elongated member, a reduced stem portion formed at the other end of said elongated member, a locking bar member having permanent magnet means located in the under side of said bar member and secured transversely to said stem portion to form a T-section, a lock nut member of greater diameter than said elongated member having a slot corresponding to the shape of said bar cut entirely through said nut, said slot being of a size slightly greater than that of said bar and a duplicate slot cut only partially through said nut at a 90° angle to said through slot to provide means for interlocking said elongated member to said T-section and said nut together by passing the slot of said slotted nut with said partial slot upward over said T-section of said elongated member to said reduced stem portion of said elongated member and rotating said nut-one-quater turn and moving same upwardly until contact is made between said partial slot and said permanent magnets to lock said elongated T-section and said nut together against movement.

References Cited

UNITED STATES PATENTS

| | | | |
|---|---|---|---|
| 1,895,826 | 1/1933 | Trudeau | 85—7 |
| 2,962,317 | 11/1960 | Morse | 85—32 |
| 3,038,232 | 6/1962 | Wean | 24—201.2 |

CARL W. TOMLIN, *Primary Examiner.*

R. S. BRITTS, *Assistant Examiner.*